US009106868B2

(12) United States Patent
Uchikawa

(10) Patent No.: US 9,106,868 B2
(45) Date of Patent: Aug. 11, 2015

(54) IMAGE PROCESSING APPARATUS, CONTROL METHOD THEREFOR, AND STORAGE MEDIUM

(71) Applicant: CANON KABUSHIKI KAISHA, Tokyo (JP)

(72) Inventor: Hiroshi Uchikawa, Yokohama (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/337,609

(22) Filed: Jul. 22, 2014

(65) Prior Publication Data

US 2014/0333954 A1 Nov. 13, 2014

Related U.S. Application Data

(62) Division of application No. 11/853,219, filed on Sep. 11, 2007.

(30) Foreign Application Priority Data

Dec. 15, 2006 (JP) ................................ 2006-339067

(51) Int. Cl.
*H04N 1/00* (2006.01)
*H04N 1/44* (2006.01)
*H04N 1/32* (2006.01)
(Continued)

(52) U.S. Cl.
CPC ............ *H04N 1/4406* (2013.01); *G06F 21/335* (2013.01); *G06F 21/608* (2013.01); *H04N 1/0048* (2013.01); *H04N 1/00915* (2013.01); *H04N 1/00917* (2013.01); *H04N 1/00925* (2013.01); *H04N 1/32496* (2013.01); *H04N 1/32625* (2013.01); *H04N 1/32657* (2013.01); *H04N 1/4426* (2013.01); *H04N 1/4433* (2013.01); *G06F 2221/2141* (2013.01); *H04N 2201/0094* (2013.01); *H04N 2201/3212* (2013.01); *H04N 2201/3225* (2013.01)

(58) Field of Classification Search
None
See application file for complete search history.

(56) References Cited

U.S. PATENT DOCUMENTS 5,968,126 A 10/1999 Ekstrom et al.
5,970,225 A 10/1999 Jackson et al.
6,031,354 A 2/2000 Wiley et al.
(Continued)

FOREIGN PATENT DOCUMENTS

CN 1842124 A 10/2006
JP 63-132367 A 6/1988
(Continued)

*Primary Examiner* — Ashish K Thomas
(74) *Attorney, Agent, or Firm* — Rossi, Kimms & McDowell LLP

(57) ABSTRACT

An image processing apparatus includes an operating unit comprising a user interface configured to receive an operation from a user who has logged-in to the image processing apparatus, a job execution unit configured to execute a job based on the received operation, a determination unit configured to determine whether the job requires an instruction via the operating unit after detecting a logout event, and a control unit configured to, when the job is determined to require the instruction via the operation unit after the logout event has been detected, prevent a user's instruction-waiting state from occurring after the user has logged-out, and when the job is determined to not require the instruction via the operation unit after the logout event has been detected, allow the job to continue under execution after the user has logged-out. At least part of the control unit is implemented by a processor and a memory.

17 Claims, 19 Drawing Sheets

(51) Int. Cl.
*G06F 21/60* (2013.01)
*G06F 21/33* (2013.01)

(56) References Cited

U.S. PATENT DOCUMENTS

| | | | | |
|---|---|---|---|---|
| 6,084,691 | A | 7/2000 | Tsai et al. | |
| 6,252,681 | B1 | 6/2001 | Gusmano et al. | |
| 6,469,402 | B2 | 10/2002 | Morimoto et al. | |
| 6,702,488 | B1 | 3/2004 | Hooper et al. | |
| 6,986,136 | B2 | 1/2006 | Simpson et al. | |
| 7,054,020 | B2 | 5/2006 | Gassho et al. | |
| 7,137,072 | B2 | 11/2006 | Bauer et al. | |
| 7,265,855 | B2 | 9/2007 | Patton | |
| 7,633,644 | B2 | 12/2009 | Lum et al. | |
| 7,684,074 | B2 | 3/2010 | Reddy et al. | |
| 8,037,521 | B2 * | 10/2011 | Minato | 726/16 |
| 8,064,075 | B2 | 11/2011 | Yoshikawa | |
| 8,094,329 | B2 | 1/2012 | Hirama | |
| 8,115,958 | B2 | 2/2012 | Tsujimoto | |
| 8,279,463 | B2 | 10/2012 | Jager et al. | |
| 8,503,030 | B2 * | 8/2013 | Goldwater et al. | 358/1.9 |
| 8,902,444 | B2 * | 12/2014 | Katahira | 358/1.14 |
| 2003/0053109 | A1 | 3/2003 | Lester et al. | |
| 2006/0007469 | A1 | 1/2006 | Uruma | |
| 2006/0009234 | A1 | 1/2006 | Freer | |
| 2006/0224660 | A1 | 10/2006 | Negishi | |
| 2008/0144071 | A1 | 6/2008 | Uchikawa | |
| 2008/0170258 | A1 * | 7/2008 | Yamamura | 358/1.15 |
| 2009/0310172 | A1 * | 12/2009 | Miyamoto | 358/1.15 |
| 2010/0231963 | A1 | 9/2010 | Oda et al. | |
| 2012/0200880 | A1 | 8/2012 | Uchikawa | |

FOREIGN PATENT DOCUMENTS

| | | | |
|---|---|---|---|
| JP | 11-120143 | A | 4/1999 |
| JP | 11-134136 | A | 5/1999 |
| JP | 2004-185629 | A | 7/2004 |
| JP | 2005-065200 | A | 3/2005 |

* cited by examiner

| FUNCTION | | | | SET VALUE |
| --- | --- | --- | --- | --- |
| APPLICATION CONTROL | APPLICATION CATEGORY CONTROL | BOX | PERMIT | PERMIT |
| | | | DENY | DENY |
| | | BROWSER | PERMIT | PERMIT |
| | | | DENY | DENY |
| | | COPY | PERMIT | PERMIT |
| | | | DENY | DENY |
| | | DEFAULT | PERMIT | PERMIT |
| | | | DENY | DENY |
| | | PRINT | PERMIT | PERMIT |
| | | | DENY | DENY |
| | | SEND | PERMIT | PERMIT |
| | | | DENY | DENY |
| | | UTILITY | PERMIT | PERMIT |
| | | | DENY | DENY |
| | APPLICATION ID CONTROL | ORIGNAL COPY | NOT SET | |
| | | | PERMIT | USE POSSIBLE |
| | | | DENY | USE IMPOSSIBLE |
| | | CUSTOMER SEND | NOT SET | |
| | | | PERMIT | USE POSSIBLE |
| | | | DENY | USE IMPOSSIBLE |
| | | : | : | |

FIG. 3B

| FUNCTION | | | | SET VALUE |
|---|---|---|---|---|
| 304 PDL PRINT FUNCTION | DENY | | | DENY |
| | PERMIT | | | PERMIT |
| | | COLOR PRINTING | WITHOUT RESTRICTIONS | COLOR |
| | | | FULL-COLOR PRINTING NOT PERMITTED | BICOLOR |
| | | | FULL-COLOR/2-COLOR PRINTING NOT PERMITTED | UNICOLOR |
| | | | ONLY MONOCHROME PRINTING | BW |
| | | PRINTING METHOD | SINGLE-SIDED PRINTING ENABLED | SIMPLEX |
| | | | ONLY DOUBLE-SIDED PRINTING | DUPLEX |
| | | PAGE LAYOUT | WITHOUT RESTRICTIONS | 1 |
| | | | 1 PAGE/SHEET NOT PERMITTED | 2 |
| | | | 1 to 2 PAGE/SHEET NOT PERMITTED | 4 |
| | | PDL TO BOX | PERMIT | PERMIT |
| | | | DENY | DENY |
| 306 BOX PRINT FUNCTION | DENY | | | DENY |
| | PERMIT | | | PERMIT |
| | | COLOR PRINTING | WITHOUT RESTRICTIONS | COLOR |
| | | | FULL-COLOR PRINTING NOT PERMITTED | BICOLOR |
| | | | FULL-COLOR/2-COLOR PRINTING NOT PERMITTED | UNICOLOR |
| | | | ONLY MONOCHROME PRINTING | BW |
| | | PRINTING METHOD | SINGLE-SIDED PRINTING ENABLED | SIMPLEX |
| | | | ONLY DOUBLE-SIDED PRINTING | DUPLEX |
| | | PAGE LAYOUT | WITHOUT RESTRICTIONS | 1 |
| | | | 1 PAGE/SHEET NOT PERMITTED | 2 |
| | | | to 2 PAGE/SHEET NOT PERMITTED | 4 |

FIG. 3C

| | FUNCTION | | | | SET VALUE |
|---|---|---|---|---|---|
| 308 | COPY FUNCTION | DENY | | | DENY |
| | | PERMIT | | | PERMIT |
| | | | COLOR PRINTING | WITHOUT RESTRICTIONS | COLOR |
| | | | | FULL-COLOR PRINTING NOT PERMITTED | BICOLOR |
| | | | | FULL-COLOR/2-COLOR PRINTING NOT PERMITTED | UNICOLOR |
| | | | | ONLY MONOCHROME PRINTING | BW |
| | | | PRINTING METHOD | SINGLE-SIDED PRINTING ENABLED | SIMPLEX |
| | | | | ONLY DOUBLE-SIDED PRINTING | DUPLEX |
| | | | PAGE LAYOUT | WITHOUT RESTRICTIONS | 1 |
| | | | | 1 PAGE/SHEET NOT PERMITTED | 2 |
| | | | | 1 to 2 PAGE/SHEET NOT PERMITTED | 4 |
| 310 | SCAN FUNCTION | DENY | | | DENY |
| | | PERMIT | | | PERMIT |
| | | | SCAN | PERMIT | PERMIT |
| | | | | DENY | DENY |
| | | | COLOR SCAN | COLOR SCAN PERMITTED | COLOR |
| | | | | FORCIBLE MONOCHROME SCAN | BW |

| FUNCTION | | | | SET VALUE |
|---|---|---|---|---|
| SEND FUNCTION | DENY | | | DENY |
| | PERMIT | | | PERMIT |
| | | E-MAIL TRANSMISSION | PERMIT | PERMIT |
| | | | DENY | DENY |
| | | I-FAX TRANSMISSION | PERMIT | PERMIT |
| | | | DENY | DENY |
| | | FAX TRANSMISSION | PERMIT | PERMIT |
| | | | DENY | DENY |
| | | FTP TRANSMISSION | PERMIT | PERMIT |
| | | | DENY | DENY |
| | | NCP TRANSMISSION | PERMIT | PERMIT |
| | | | DENY | DENY |
| | | SMB TRANSMISSION | PERMIT | PERMIT |
| | | | DENY | DENY |
| | | WEBDAV TRANSMISSION | PERMIT | PERMIT |
| | | | DENY | DENY |
| | | BOX TRANSMISSION | PERMIT | PERMIT |
| | | | DENY | DENY |
| | | DESIGNATION OF ADDRESS DOMAIN | PERMIT | PERMIT |
| | | | DENY | DENY |
| | | USE OF ADDRESS TABLE | WITHOUT RESTRICTIONS | READ WRITE |
| | | | ONLY READ PERMITTED | READ ONLY |
| | | | NOT ALLOWABLE | NOT AVAILABLE |
| | | TRANSMISSION TO NEW ADDRESS | PERMIT | PERMIT |
| | | | DENY | DENY |

FIG. 6

```
<?xml version="1.0" encoding="UTF-8"?>
<ACT      xmlns="http://www.xxxxx.com/"
          xmlns:saml="urn:oasis:tc:SAML:2.0:assertion"
601       xmlns:xsi="http://www.w3.org/2001/XMLSchema-instance" >
  <Version>01.01</Version>
  <UserInfo>
    <UserName>user_0001</UserName>
    <BaseRole> GeneralUser </BaseRole>
602 <UserEmail>user_0001@mail.com </UserEmail>
  </UserInfo>
<DeviceAccessControl>
  <AttributeCategory Name="Application" CategoryStatus ="Static">
    <saml:AttributeStatement>
      <saml:Attribute Name="ApplicationId">
        <saml:AttributeValue Name="UseImpossible">aaaaaaaaaa</saml:AttributeValue>
      </saml:Attribute>
      <saml:Attribute Name="ApplicationCategory">
        <saml:AttributeValue Name="PrintCategory">Deny</saml:AttributeValue>
        <saml:AttributeValue Name="CopyCategory">Permit</saml:AttributeValue>
        <saml:AttributeValue Name="SendCategory">Deny</saml:AttributeValue>
        <saml:AttributeValue Name="BoxCategory">Permit</saml:AttributeValue>
        <saml:AttributeValue Name="BrowserCategory">Deny</saml:AttributeValue>
        <saml:AttributeValue Name="UtilityCategory">Deny</saml:AttributeValue>
      </saml:Attribute>
    </saml:AttributeStatement>
  </AttributeCategory>
  <AttributeCategory Name="DeviceCapability" CategoryStatus ="Static">
    <saml:AttributeStatement>
      <saml:Attribute Name="PdlPrint">
        <saml:AttributeValue Name="PdlPrintFlag">Permit</saml:AttributeValue>
        <saml:AttributeValue Name="ColorPrint">Color</saml:AttributeValue>
    <saml:AttributeValue Name="Simplex">Permit</saml:AttributeValue>
        <saml:AttributeValue Name="Nup"> 4 </saml:AttributeValue>
      </saml:Attribute>
      <saml:Attribute Name="Copy">
        <saml:AttributeValue Name="CopyFlag">Permit</saml:AttributeValue>
        <saml:AttributeValue Name="ColorCopy">BiColor</saml:AttributeValue>
    <saml:AttributeValue Name="Simplex">Permit</saml:AttributeValue>
        <saml:AttributeValue Name="Nup"> 4 </saml:AttributeValue>
      </saml:Attribute>
      <saml:Attribute Name="Scan">
        <saml:AttributeValue Name="ScanFlag">Permit</saml:AttributeValue>
        <saml:AttributeValue Name="ColorScan">Bw</saml:AttributeValue>
      </saml:Attribute>
      <saml:Attribute Name="Send">
        <saml:AttributeValue Name="SendFlag">Permit</saml:AttributeValue>
        <saml:AttributeValue Name="Email">Deny</saml:AttributeValue>
        <saml:AttributeValue Name="IFax">Deny</saml:AttributeValue>
        <saml:AttributeValue Name="Fax">Deny</saml:AttributeValue>
        <saml:AttributeValue Name="Ftp">Deny</saml:AttributeValue>
        <saml:AttributeValue Name="SendDomain">Deny</saml:AttributeValue>
        <saml:AttributeValue Name="AddressManagement">ReadOnly</saml:AttributeValue>
        <saml:AttributeValue Name="SendNewAddress">Deny</saml:AttributeValue>
      </saml:Attribute>
    </saml:AttributeStatement>
  </AttributeCategory>
  </DeviceAccessControl>
</ACT>
```

Enter a user name and password and press the [Log In]key.

- User Name
tanaka touch the field to entar characters

- Password touch the field to entar characters

- DNS Domain Name
MAINDOMAIN ▼

Log In ↵

SYSTEM STATUS/CANCEL ▶

IMAGE PROCESSING APPARATUS, CONTROL METHOD THEREFOR, AND STORAGE MEDIUM

BACKGROUND OF THE INVENTION

1. Field of the Invention

The present invention relates to an image processing apparatus, a control method therefor, and a storage medium.

2. Description of the Related Art

In recent years, computer networks (hereinafter simply referred to as "networks") via which a plurality of computers are interconnected have been widely used. Such a network can be constructed on a floor of a building or in an entire building, in a group of buildings (local area), or over a wider area. Further, such networks are interconnected to form a global network, i.e. the so-called "Internet".

In many cases, connected to a network are not only computers, but also computer peripheral devices (printing apparatuses), such as printers, facsimiles, and copying machines, so that these computer peripheral devices can used over the network.

Printing via a network (network printing) is advantageous in that the use of a large-sized high-speed printer or an expensive color printer can be shared for use by a plurality of computers and that printing can be performed from a remote place. Therefore, recently, the network printing has come into widespread use.

Further, recent copying machines have not only a function of copying originals, but also a function of performing a print job from an external client and a function of electronically transmitting a scanned original to an external apparatus by e-mail or using a file transfer function. This type of copying machine is called the MFP (Multi Function Peripheral).

While multi-functional copying machines (MFPs) have come into use, the risk of information leakage is increased due to development of the function of sending scanned information to an external apparatus, which brings about administration problems.

There have been proposed several means for solving the administration problems.

For example, there has been proposed an access control technique in which each user is managed by an ID, and available functions, resources, and time are controlled i.e. restricted on an ID-by-ID basis (see Japanese Laid-Open Patent Publication (Kokai) No. H11-134136). Further, there has also been proposed a technique in which access policy information is issued to an authenticated user (see Japanese Laid-Open Patent Publication (Kokai) No. 2004-185629).

Due to a plurality of factors including the above-mentioned security factor, and personalization as a factor from a different viewpoint, it is becoming very import for MFPs as shared-type office apparatuses to be designed for multi-user use.

An embodiment of such an MFP has been disclosed in which session management associated with a user is performed by causing a user to log in to the MFP by entering the user's own user name and password for authentication and approval, and log out when terminating the use of the MFP.

During this session, the MFP is required to execute access control based on the approval information on the logged-in user and personalize operating screens and an operating method based on property information of the logged-in user. Furthermore, to improve productivity, the MFP is required to execute a job efficiently even after logout of the user, while considering security and user-friendliness.

Several techniques have already been proposed for such session management.

For example, a method has been proposed in which logout processing is disabled according to the state of a job (see Japanese Laid-Open Patent Publication (Kokai) No. 2005-65200). Further, a personalization technique has been proposed in which when a user logs in, an appropriate menu is displayed, based on whether or not a job is being executed by another user (see Japanese Laid-Open Patent Publication (Kokai) No. H11-120143).

As an example of the MFP in which access to functions is controlled on a user-by-user basis as described hereinabove, a discussion will be made on an MFP equipped with the copy, scan, and box (storage) functions. For example, in a case where a user A authorized to use all the functions logs out with a scan job left under execution, and then a user B who logs in next is authorized to use only the copy function, the user B is kept waiting until the preceding scan job terminates.

A first problem is concerning a job requiring some operational instruction from the start of execution of the job and before the end of the same (this type of job will be hereinafter referred to as "the interactive job"). An example of the interactive job is a job designated for performing a continuous scan operation in which a plurality of originals are scanned by manually replacing one original with another on the original platen glass of an MFP and then inputting a scan instruction. Another example of the interactive job is an original preview job in which a scanned original image is displayed on the display unit of the MFP after completion of original scanning, and then after checking the scanned original image, the user proceeds to next processing. Further, a test copy job in which when printing out a plurality of copies in a copy job, a first copy of the printout is checked, and then an instruction for printing out the remaining copies is given is also an example of the interactive job.

In the above-described example, the preceding scan job being executed by the user A in the above example is an interactive job. Now, the case in which the MFP is at rest in a state awaiting acceptance of an operational instruction from the user A will be considered. If the user B were capable of giving some operational instruction for the scan job suspended awaiting a user instruction, it would be possible to resume the operation of the preceding scan job. However, the user B cannot operate the scan job, because when the user B, who is unauthorized to operate the scan function, logs in to the MFP, an operating screen for operating the scan function is not displayed. For this reason, the preceding scan job does not terminate, remaining in a state awaiting the operational instruction from the user A, which hinders the user B form executing a copy job using the copy function which the user B is authorized to use.

A second problem is concerning occurrence of an original jam during scan operation. In the above example, the user B is unauthorized to operate the scan job, and hence cannot carry out an operation for restoring the job from the standby state even after the MFP has recovered from the original jam. This makes it impossible for the user B to execute even a copy job which the user B is authorized to execute.

As a conventional technique for solving such a problem of scan job, a method of disabling logout during scanning has been disclosed in Japanese Laid-Open Patent Publication (Kokai) No. 2005-65200. According to the prior art, however, in the case of dealing with numerous originals, a user is required to stay beside the MFP until termination of scanning when considering security.

For this reason, it is not possible to satisfy the use case of executing one job and then starting another, which impairs user-friendliness and degrades productivity of the MFP. Further, no technique has been disclosed which improves the productivity of the MFP based on settings of a job being under execution when a user logs out.

SUMMARY OF THE INVENTION

The present invention provides an image processing apparatus, and a control method therefor, and a storage medium, for solving the above-described problems.

In a first aspect of the present invention, there is provided an image processing apparatus comprising a detector unit configured to detect an event that a user logged in to the image processing apparatus logs out, an query unit configured to be operable when the detector unit detects the event, to query the user whether or not to change a setting of a job under execution, and a control unit configured to be operable when the setting of the job is to be changed as a result of the query made by the query unit, to change the setting of the job and then perform a logout, and, when the setting of the job is not to be changed as a result of the query made by the query unit, to restrict the logout.

In a second aspect of the present invention, there is provided an image processing apparatus comprising a detector unit configured to detect an event that a user logs in to the image processing apparatus, a determination unit configured to be operable when the event is detected by the detector unit, to determine whether or not an interactive job that requires an instruction from a user after a start of execution of the job and before an end of the execution of the job is under execution; and a control unit configured to be operable when the determination unit determines that the interactive job is under execution, to query a user whether or not to cancel the interactive job, and, when the determination unit determines that the interactive job is not under execution, to perform a login to the image processing apparatus without making the query.

The above and other objects, features, and advantages of the invention will become more apparent from the following detailed description taken in conjunction with the accompanying drawings.

BRIEF DESCRIPTION OF THE DRAWINGS

FIGS. 3A to 3D are view of a list of controllable ACEs.

FIG. 6 is a view showing an example of an ACT generated in the network print management system shown in FIG. 1.

DETAILED DESCRIPTION OF THE PREFERRED EMBODIMENTS

The present invention will now be described in detail with reference to the drawings showing a preferred embodiment thereof.

Figure 1:
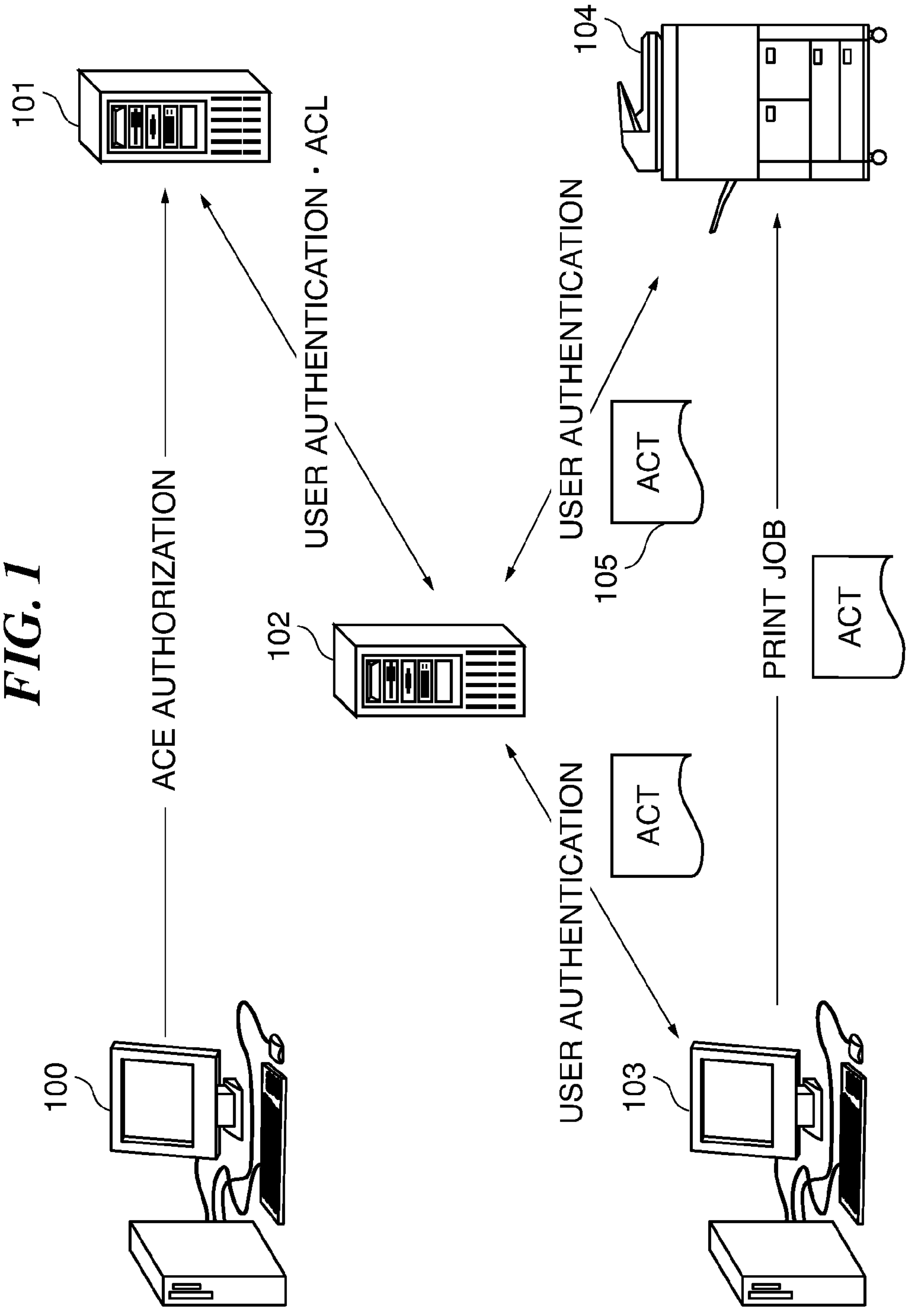
FIG. 1 is a conceptual view of a network print management system including an MFP according to an embodiment of the present invention.

FIG. 1 is a conceptual view of a network print management system including MFPs according to the embodiment of the present invention.

Referring to FIG. 1, the network print management system is comprised of a device (MFP), server PCs, and client PCs connected to a network, and controls i.e. restricts access by users who use the device, and execution of jobs, e.g. the number of sheets to be printed. It should be noted that users in the present embodiment include individual users, office departments, and organizations.

A system administrator utility (AU) 100 operates on a server PC to configure and manage the present system. In particular, the AU 100 is capable of configuring access control entries (hereinafter referred to as "the ACEs") stored in a user information server 101.

The user information server (DS) 101 stores user information, such as user IDs and passwords, and access control lists (hereinafter referred to as "the ACLs") as sets of ACEs indicating which functions of the system are authorized to be used, on a user-by-user basis or on a device-by-device basis. The user information server 101 is implemented e.g. by an LDAP server or a Microsoft Active Directory server.

A ticket issuing server (SA) 102 issues a ticket describing information on available functions with reference to the ACLs stored in the user information server 101. This ticket will be described in detail hereinafter.

A printer driver (Drv) 103 operates on each client PC. To use the client PC, it is required to log in so as to make it clear which user is using the client.

The MFP 104 as the image processing apparatus according to the present embodiment is capable of not only copying sheet originals, but also printing out print data delivered from the external printer driver 103. Further, the MFP 104 has a function of reading image data from a sheet original and sending the image data to an external file server or a mail server (send function, remote scan function). Furthermore, the MFP 104 has a function of transmitting read-in data to another MFP and printing the data by the MFP (remote copy function).

Each of ACTs (Access Control Tokens) 105 contains information on functions which a user can execute using the MFP 104 and information on control (restrictions) of access to the MFP 104, and plays the role of transferring these items of information from the ticket issuing server 102 to the device (MFP 104).

It is assumed that the functional blocks 100 to 104 are interconnected via a network, not shown, implemented e.g. by Ethernet (registered trademark). However, it is only an example of the system. All the units except the MFP 104 may be implemented by client computers, or several server computers.

Further, a plurality of MFPs and client PCs may be connected to the network print management system. The user information server 101 and the ticket issuing server 102 may be integrated in a single server apparatus or incorporated in a specific MFP. When the network print management system includes a plurality of MFPs, the user information server 101 and the ticket issuing server 102 are capable of issuing ACTs 105 to the respective MFPs. If the user information server 101 and the ticket issuing server 102 are incorporated in an MFP, the ticket issuing function thereof may be configured to issue ACTs to the MFP alone. Further, the user information server 101 or the ticket issuing server 102 may store access control entries concerning the MFP.

In short, interface between the functional blocks 100 to 103 may be provided by a physical communication medium, such as a network, a local interface, or a CPU bus. Alternatively, the interface may be formed by logical interface implemented in software for message communication. Further, the above-mentioned functional blocks may be implemented by a program which is executed by a CPU for execution of the functions, or alternatively may be implemented by hardware circuits.

The overall operation of the system shown in FIG. 1 is specifically carried out by the following sequence:

1. The AU 100 sets user-specific access control entries (ACEs) in the DS 101 and stores these as ACLs in the DS 101.

2. The MFP 104 requests the SA 102 to issue an ACT 105 describing access control entries of the MFP 104, when the MFP 104 is turned on or reset.

3. The SA 102 acquires the access control entries concerning the MFP 104 from the ACLs stored in the DS 101, and issues an ACT 105 containing the access control entries. The SA 102 places an electronic signature on the ACT 105 so as to certify that the ACT 105 has been issued by the SA 102, and then delivers the ACT 105 to the MFP 104.

4. The MFP 104 executes initialization thereof based on the contents of the acquired ACT 105 and completes its start-up.

5. When a user attempts to log in the MFP 104, the MFP 104 request the SA 102 to issue an ACT 105 together with qualification information including the user name and password of the user attempting to log in.

6. The SA 102 delegates processing for authentication of the user to the DS 101. If the authentication processing by the DS 101 is successful, access control entries associated with the user are acquired from the ACLs stored in the DS 101. Then, the SA 102 generates an ACT 105 reflecting settings of functions of the MFP 104 which the user is authorized to use, places the electronic signature on the ACT 105 so as to certify that the ACT 105 has been issued by the SA 102, and then sends the ACT 105 in reply to the MFP 104.

7. The MFP 104 modifies a function screen to be displayed, based on the access control entries recorded in the ACT 105, and then displays the screen. Further, based on the ACT 105, the MFP 104 controls whether to enable or disable execution of a function designated by the user.

Figure 15:
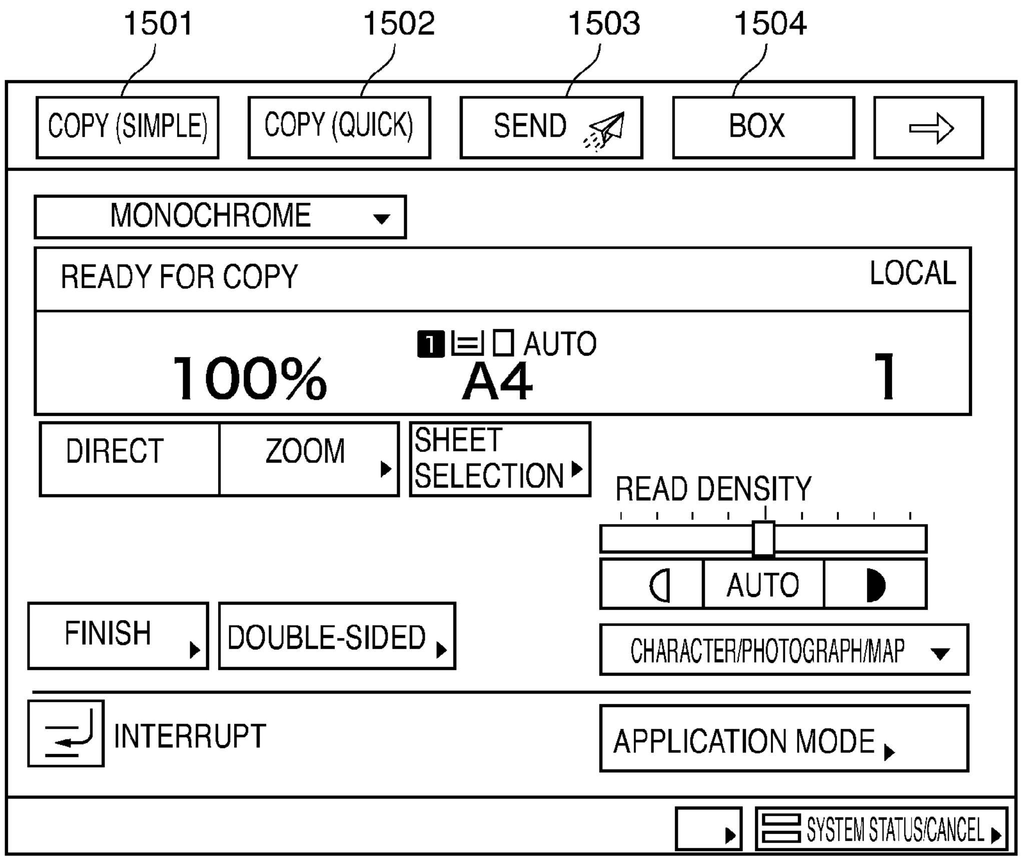
FIG. 15 is a view illustrating an example of an operating screen displayed on the operating unit of the MFP appearing in FIG. 2.

FIG. 15 shows an example of an operating screen displayed on an operating unit 203 (see FIG. 2) of the MFP.

In FIG. 15, tabs 1501 to 1504 are buttons associated with the respective functions provided for the MFP. When one of the tabs 1501 to 1504 is pressed, an operating screen for a function associated with the pressed tab is displayed. A copy (simple) tab 1501 and a copy (quick) tab 1502 are buttons associated with the copy function. A send tab 1503 is a button associated with the send function. A box tab 1504 is a button associated with the box function. Displayed on the operating unit 203 are tabs associated with respective functions which a logged-in user is authorized to use.

Figure 2:
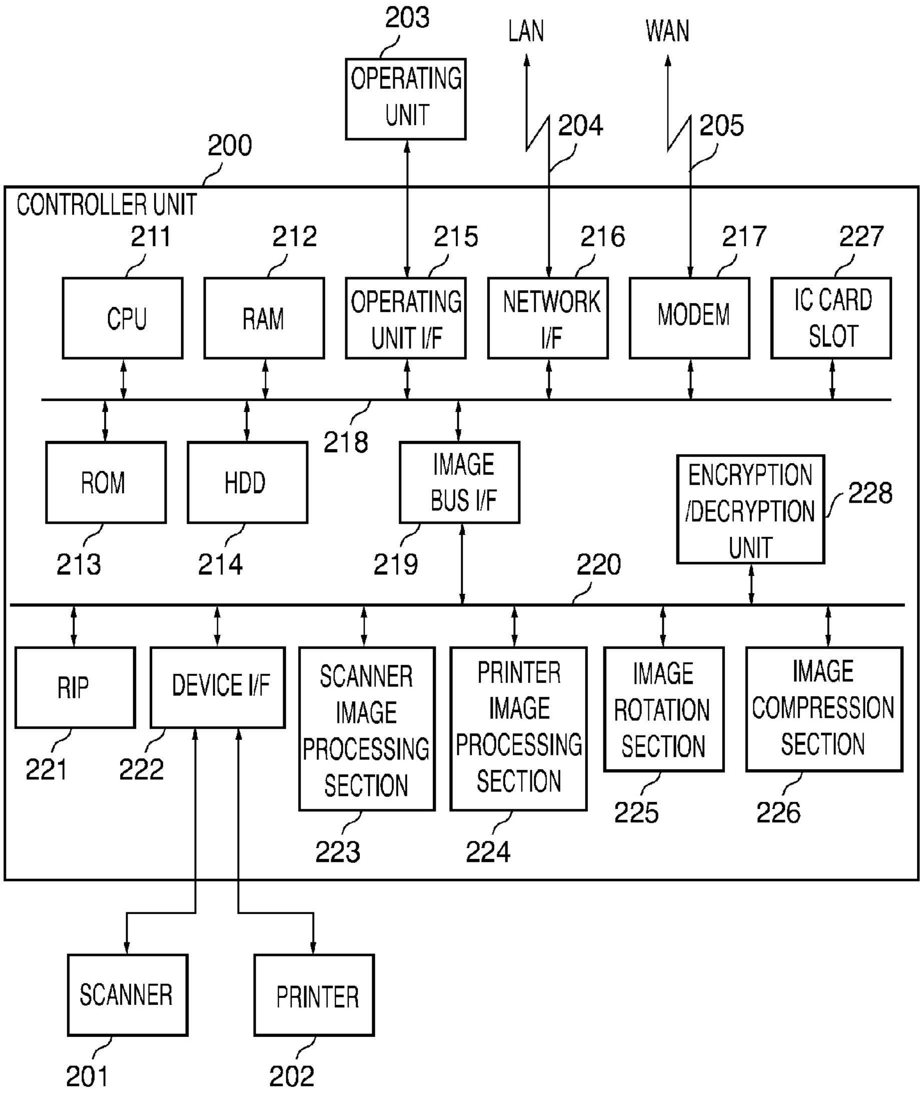
FIG. 2 is a block diagram of the MFP appearing in FIG. 1.

FIG. 2 is a block diagram of the MFP appearing in FIG. 1.

As shown in FIG. 2, the MFP 104 has a controller unit 200. The controller unit 200 is connected to a scanner 201 as an image input device, a printer 202 as an image output device, and the operating unit 203, as well as to a LAN 204 and a WAN 205 as a public telephone line so as to input and output image information and device information.

In the controller unit 200, a CPU 211 controls the overall operation of the system. A RAM 212 is a system work memory used for the CPU 301 to operate. The RAM 212 also functions as an image memory for temporarily storing image data. A ROM 213 is a boot ROM, and stores a boot program for the system. An HDD 214 is a hard disk drive, and stores system software and image data.

An operating unit I/F 215 provides interface with the operating unit 203 having a touch panel, and outputs to the operating unit 203 image data to be displayed on the same. The operating unit I/F 215 also plays the role of transferring information input by a user of the present system via the operating unit 203 to the CPU 201.

A network I/F 216 is connected to the LAN 204, for input and output of information. A modem 217 is connected to the WAN 205, for input and output of information. The above-mentioned devices are arranged on a system bus 218.

An image bus I/F 219 is a bus bridge that connects between the system bus 218 and an image bus 220 for high-speed transmission of image data, and at the same time converts the data structure of the image data. The image bus 220 is implemented by a PCI bus or an IEEE 1394 bus. On the image bus 220, there are arranged devices described below.

A raster image processor (RIP) 221 expands a PDL code into a bitmap image. A device I/F unit 222 connects between the controller unit 200, and the scanner 201 as an input device and the printer 202 as an output device, to perform synchronous-to-asynchronous or asynchronous-to-synchronous conversion of image data.

A scanner image processing section 223 corrects, processes, and edits input image data. A printer image processing section 224 performs correction, resolution conversion, etc. of image data to be printed out. An image rotation section 225 rotates image data. An image compression section 226 compresses or expands multi-valued image data according to a JPEG format, and binary image data according to a JBIG, MMR or MH format.

Into an IC card slot 227, an IC card is inserted, and then an appropriate PIN (Personal Identifier Number) code is input, whereby input/output of a key for use in encryption and decryption is enabled. An encryption/decryption section 228 is a hardware accelerator board that performs encryption/decryption of data using the key of the IC card slot 227.

FIGS. 3A to 3D are view of a list of ACEs.

The ACEs 300 are comprised of items described below.

In FIGS. 3A to 3D, an application control 302 sets whether or not to perform access (use) control of the copy, send, box, print, and browser applications (functions). A controlled application (function), i.e. an application (function) which the user is restricted from using, is not displayed on the operating unit of the MFP, so that the application cannot be selected, thus disabling the user from using the function.

A PDL print function 304, a box print function 306, and a copy function 308 each include ACEs for color control, single-sided/double-side print control, and layout control to be executed when printing out data on a sheet. Each of the ACEs can be set for a function enabled in the application control 302. A scan function 310 includes an ACE for color control to be executed when converting a sheet original into electronic data. A send function 312 includes ACEs for transmission protocol control executed in sending electronic data, an address list, and addresses.

Figure 4:
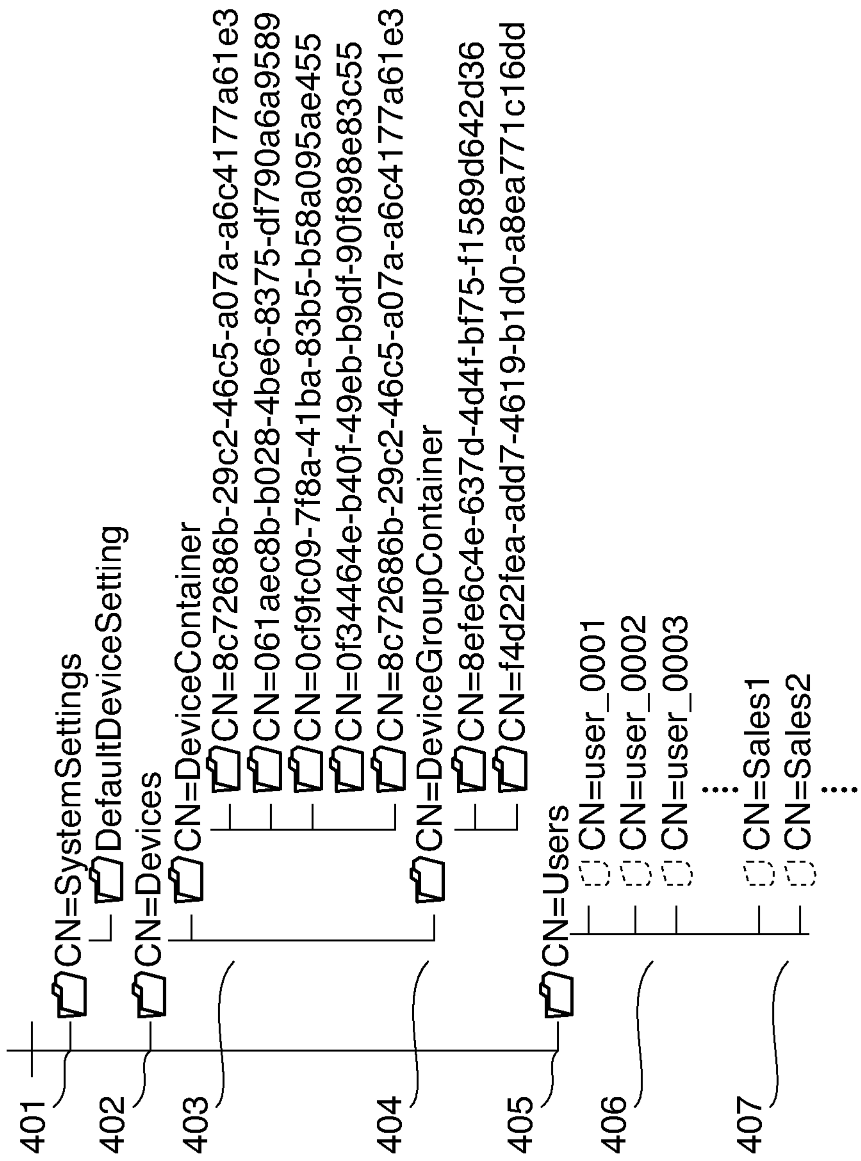
FIG. 4 is a view of the directory structure of device information and user information stored in a DS appearing in FIG. 1.

FIG. 4 is a view of the directory structure of device information and user information stored in the DS appearing in FIG. 1.

The device information and the user information are configured by the AU 100. It should be noted that these may be stored not in the DS 101, but in the MFP 104.

Referring to FIG. 4, a directory SystemSetting 401 is a container for a system policy applied to the entire system. The directory SystemSetting 401 contains DefaultSetting as a sub directory for storing default settings.

A directory Devices 402 is a container for device information. The directory Devices 402 contains DeviceContainer 403 and DeviceGroupContainer 404 as sub directories.

The directory DeviceContainer 403 is a container holding sub directories for storing respective device information items registered in the present system.

The directory DeviceGroupContainer 404 is a container holding sub directories for storing respective items of information on device groups into which devices are grouped.

A directory Users 405 is a container holding sub directories for storing respective items of information on user groups into which users are grouped.

Figure 5A:
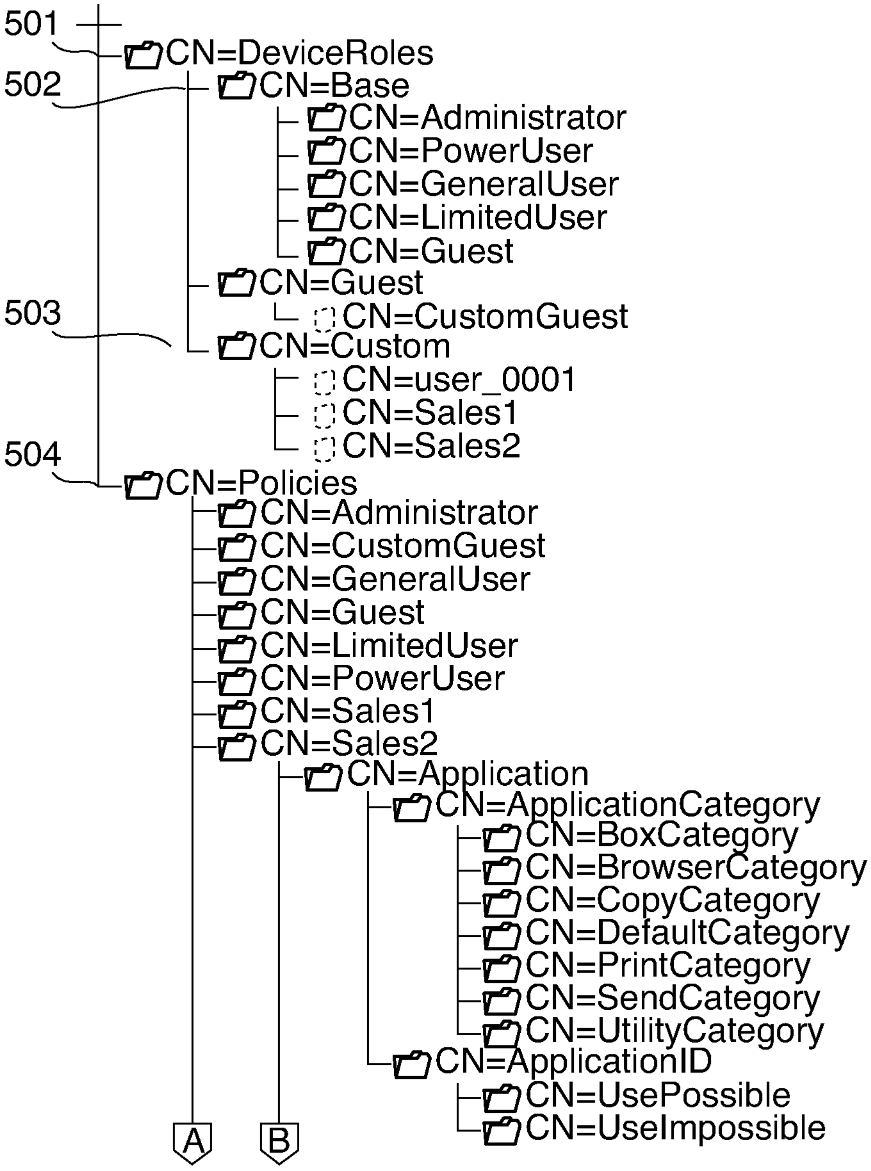
FIGS. 5A-5B are views of the directory structure of ACLs stored in the DS appearing in FIG. 1.
Figure 5B:
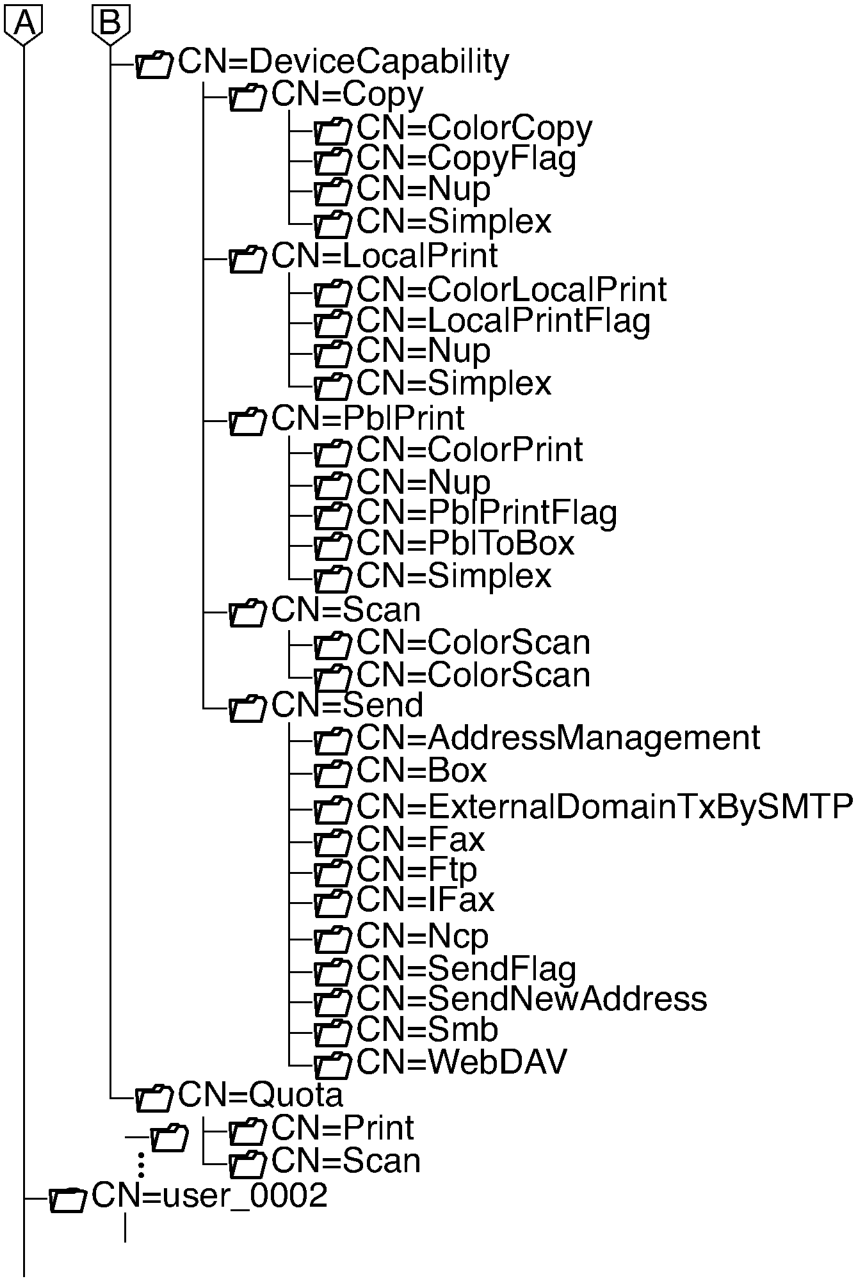

FIGS. 5A-5B are views of the directory structure of the ACLs stored in the DS appearing in FIG. 1.

The directories of the ACLs are set by the AU 100. It should be noted that these may be stored not in the DS 101, but in the MFP 104, similarly to the information described above with reference to FIG. 4.

Referring to FIGS. 5A-5B, a directory DeviceRoles 501 is a container for information on roles having references to the ACLs. The directory DeviceRoles 501 contains containers, such as Base 502 and Custom 503, as sub directories.

The directory Base 502 is a container for role information items registered in the present system in advance. In the present system, five role information items are defined.

The directory Custom 503 is a container for user-defined role information items which are expanded based on the role information items stored in the directory Base 502, and stored in respective sub directories.

A directory Policies 504 is a container for a plurality of ACLs. The directory Policies 504 contains containers for the ACLs, which are assigned respective names common to those of the sub directories of the directories Base 502 and Custom 503 in which the role information items are stored. In the present system, the ACEs shown in FIGS. 3A to 3D are stored in the DS 101 as ACLs associated with roles appearing in FIGS. 5A-5B.

FIG. 6 is a view showing an example of an ACT generated in the network print management system shown FIG. 1.

In FIG. 6, user information 601 of the ACT is a part indicative of information concerning a user who has acquired this ATC. In the illustrated example, it is indicated that the user is user 0001 and assigned a role "GeneralUser" as a base role, and has a mail address of user_0001@mail.com. In a case where the MFP 104 makes a request for issuing the ACT 105 e.g. upon turn-on of the power, the ACT 105 may not contain the user information 601.

Access control entries 602 are part describing functions which the user having acquired the ACT 105 is authorized to use. In the present example, Copy and Box are described as available application categories, and Send, Print, Browser, and Utility are described as unavailable. In a case where the MFP 104 makes a request for issuing the ACT 105 e.g. upon turn-on of the power thereof, the access control entries 602 contain access control entries restricting functions of the MFP 104.

Figure 7:
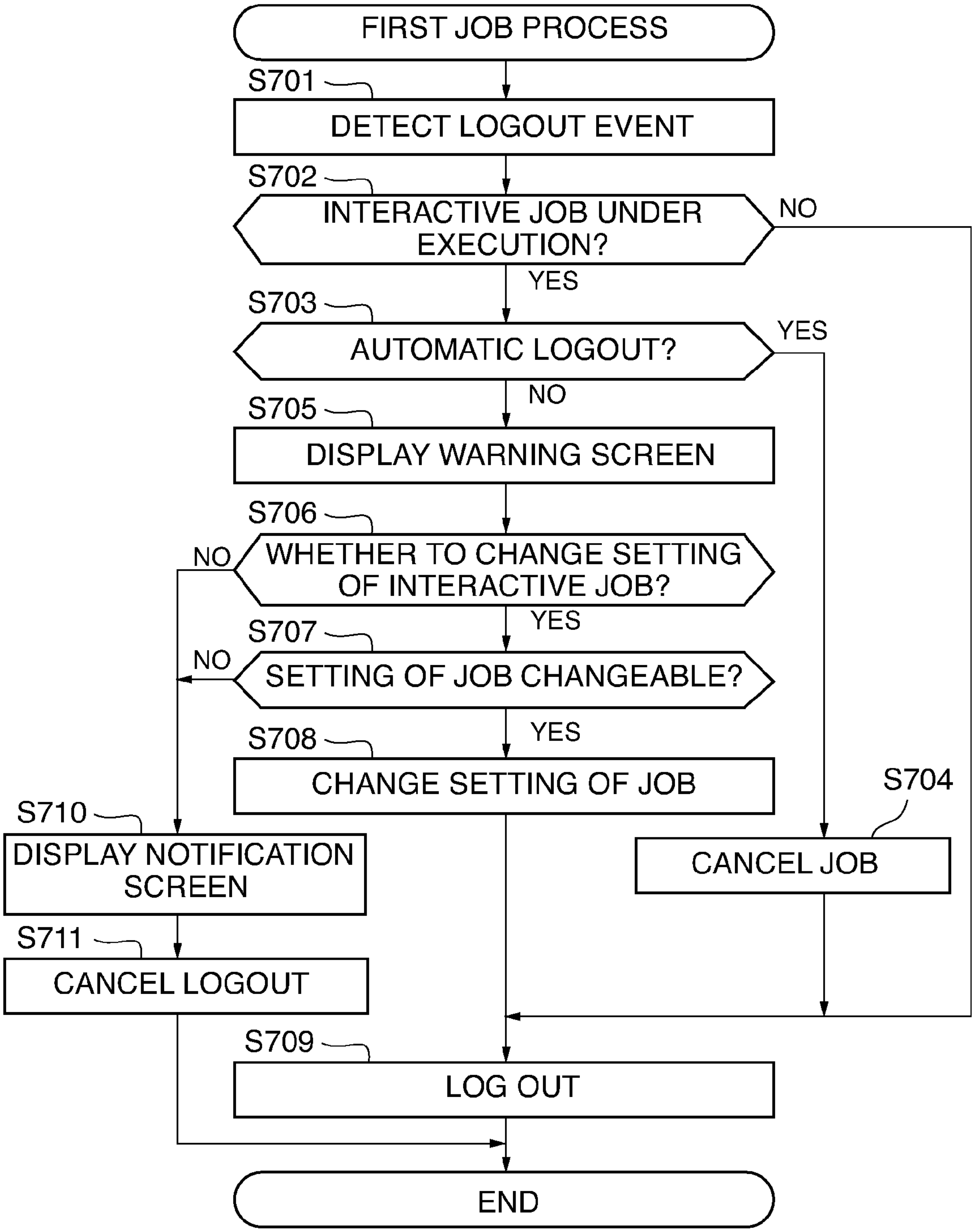
FIG. 7 is a flowchart of a first job process which is executed by the MFP in FIG. 2.

FIG. 7 is a flowchart of a first job process which is executed by the MFP in FIG. 2.

The present process is executed by the CPU 201 of the MFP 104.

Referring to FIG. 7, first, a logout event is detected which occurs when a currently logged-in user notifies the MFP 104 that the user will log out (step S701).

Then, it is determined whether or not an interactive job which can be shifted to an interaction mode is under execution (step S702). Examples of the interactive job include a job for designating continuous scan on an original platen glass, an original preview job for checking a scanned original to proceed to the following processing, and a test copy job for checking a first one of a plurality of copies of printout and then outputting the remaining copies. In short, an interactive job means a job requiring some operational instruction (hereinafter referred to as "interaction") after the start of execution of the job and before the completion of the same. The job is not completed if it remains awaiting the interaction.

The interactive job which can be shifted to the interaction mode means a job wherein an operational instruction (interaction) from the user has not been completed yet during execution of the interactive job. For example, if preview has not been completed in a preview job, in which the user should confirm the scanned details of an original after scanning of the original, the preview job is regarded as an interactive job which can be shifted to the interaction mode.

In other words, the fact that an interactive job which can be shifted to the interaction mode is under execution means that a state (interaction mode) of the MFP 104 in which an operational instruction (interaction) by the user is required will occur before completion of the job under execution, or the state (interaction mode) has already occurred.

Figure 9:
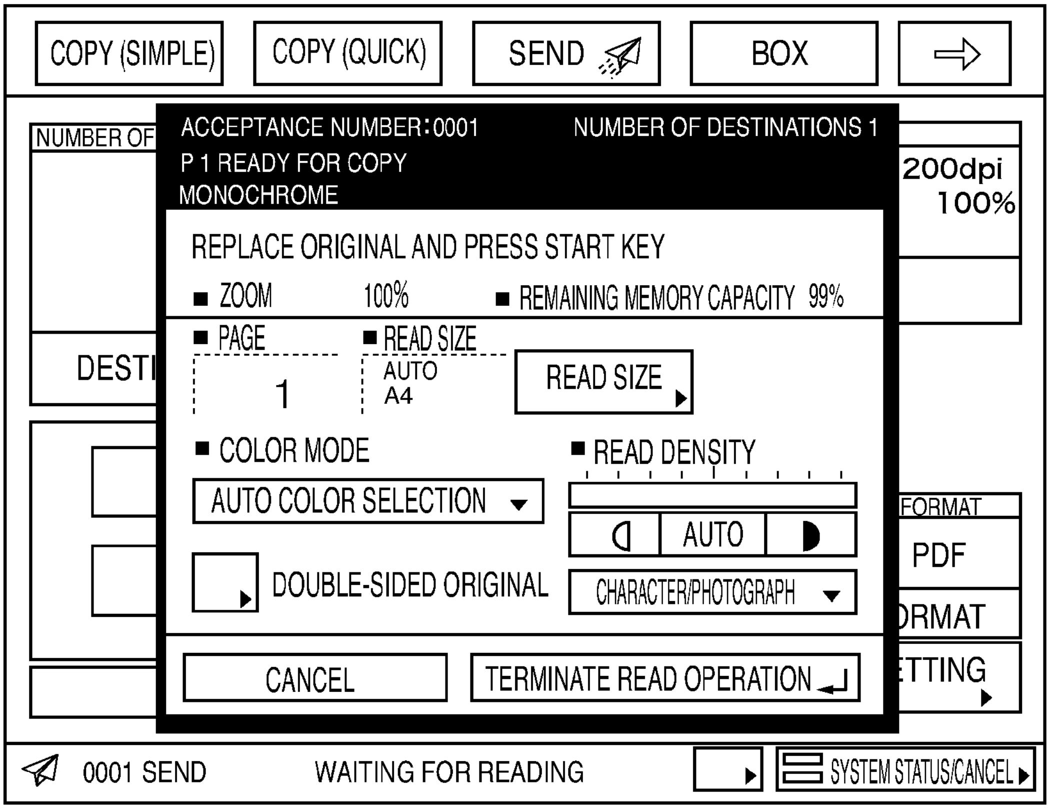
FIG. 9 is a view illustrating an example of a scan job execution screen displayed on an operating unit appearing in FIG. 2, when a logout event occurs.

FIG. 9 shows an example of a state where a job of the send function in which continuous scan and preview are designated is suspended awaiting any of instructions for scanning a next original, terminating a reading operation, and canceling the job. This is a state where an interactive job has been shifted to the interaction mode and is on standby for interaction.

If scanning of the next original is designated, a scan operation is carried out. Alternatively, if termination of the reading operation is designated, the scan operation is terminated, and then a preview confirmation screen (not shown) requiring a further instruction from the user is displayed.

Even when an interactive job is under execution, if all operational inputs to be made by the user have already been completed and therefore the interactive job will not shift to the interaction mode, the interactive job is not regarded as an interactive job which can be shifted to the interaction mode.

If it is determined in the step S702 that no interactive job which can be shifted to the interaction mode is under execution, the process proceeds to a step S709, wherein logout processing is executed. On the other hand, if an interactive job which can be shifted to the interaction mode is under execution, the process proceeds to a step S703, wherein it is determined whether the logout event was caused by automatic logout executed due to leaving the MFP 104 unoperated over a predetermined time period or by manual logout executed in response to a user instruction.

Figure 10:
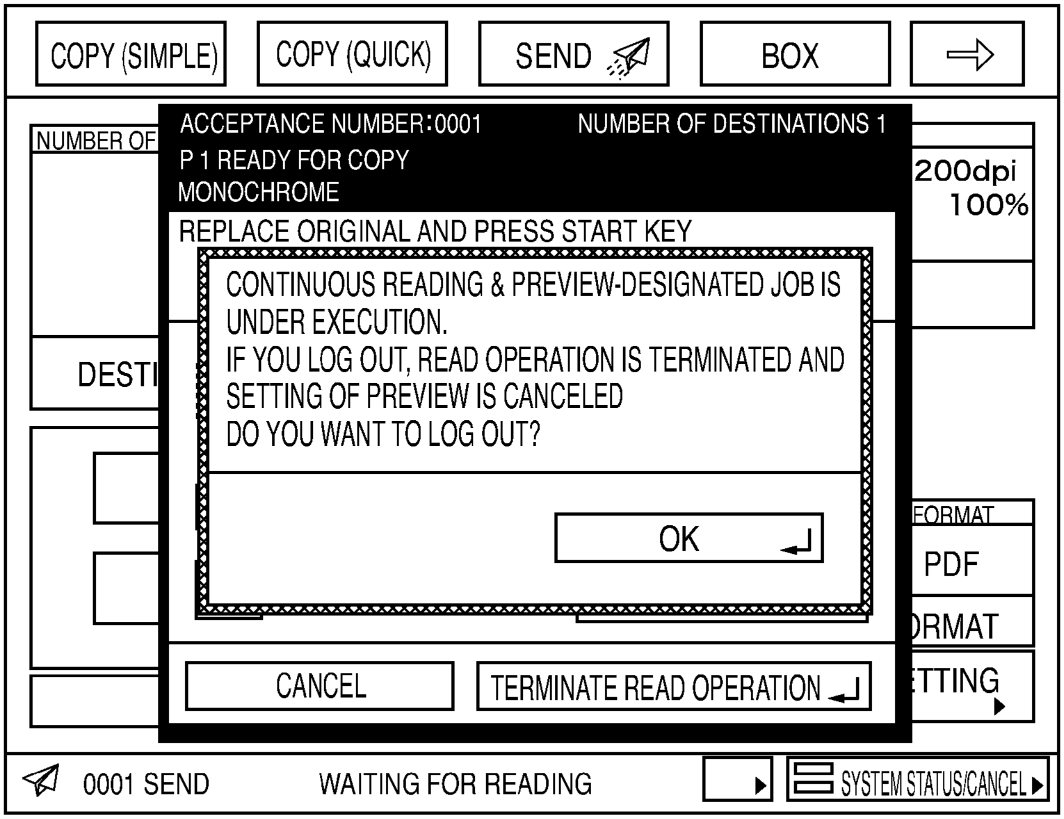
FIG. 10 is a view illustrating an example of a confirmation screen displayed on the operating unit appearing in FIG. 2, when manual logout is designated during execution of a scan job.

When the logout event was caused by automatic logout, the process proceeds to a step S704, wherein the job is canceled. Then, in the step S709, logout processing is executed, followed by terminating the present process. On the other hand, when the logout event was caused by manual logout, the process proceeds to a step S705, wherein a warning screen shown in FIG. 10 by way of example is displayed, and in a step S706, it is ascertained whether or not the user desires to change a job setting of the interactive job.

If the user selects to change the job setting of the interactive job, the process proceeds to a step S707, wherein it is determined whether or not it is possible to cancel the job setting enabling shift to the interaction mode. For example, it is determined whether or not designation of preview in the preview job can be canceled.

If it is possible to change the job setting, the process proceeds to a step S708, wherein the job setting is changed. Then, the logout processing is executed in the step S709, followed by terminating the process. As a consequence, no interaction occurs until the end of the job, so that it is possible to prevent occurrence of a state where a next user cannot use the MFP. On the other hand, if the user does not desired to change the setting of the interactive job in the step S706, the process proceeds to a step S710. If the job setting cannot be canceled in the step S707 as well, the process proceeds to the step S710.

A job setting cannot be cancelled e.g. for a job for carrying out complicated processing, such as area designation, on data read from an original while checking the data after completion of scanning, and then printing out or transmitting the processed data.

As described above, it is possible to inhibit a job setting from being changed, in the case where there is a high possibility that a change of the job setting will not produce results desired by the user.

Figure 11:
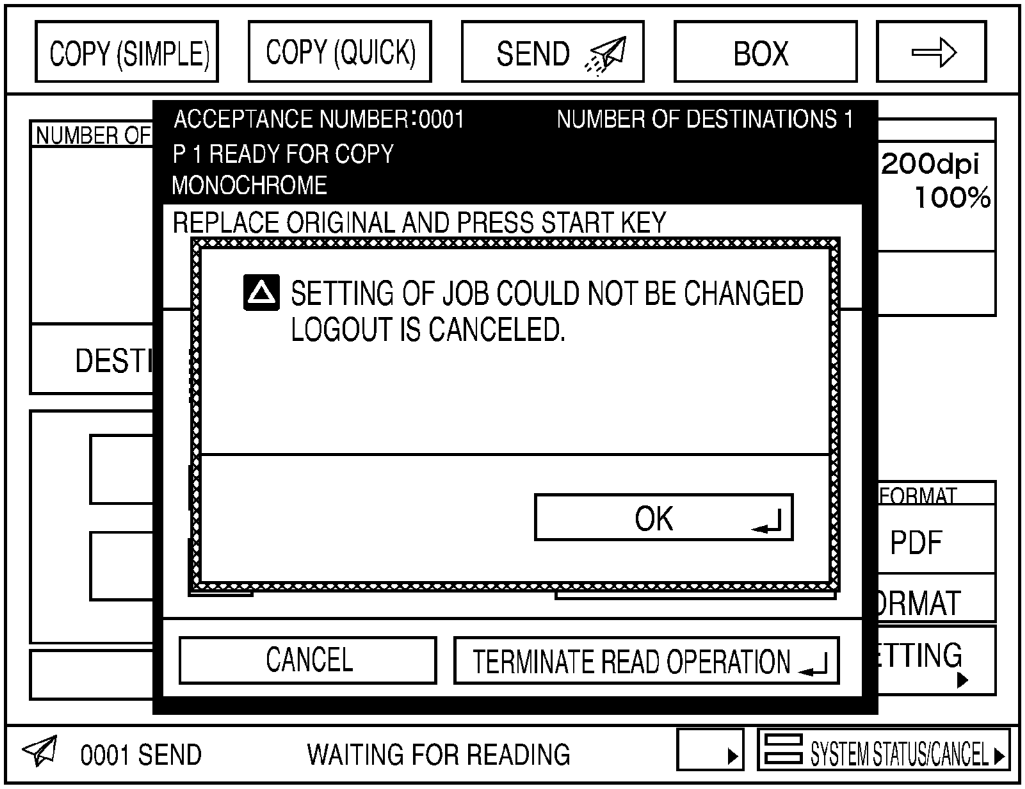
FIG. 11 is a view illustrating an example of a notification screen displayed on the operating unit appearing in FIG. 2, if a change of a setting of the job is not designated or if the setting of the job cannot be changed, when manual logout is designated during execution of the scan job.

In the step S710, a screen, shown in FIG. 11 by way of example, for notifying the user that the logout processing will not be executed is displayed, and then execution of the logout processing is canceled in a step S711, followed by terminating the present process.

Figure 12:
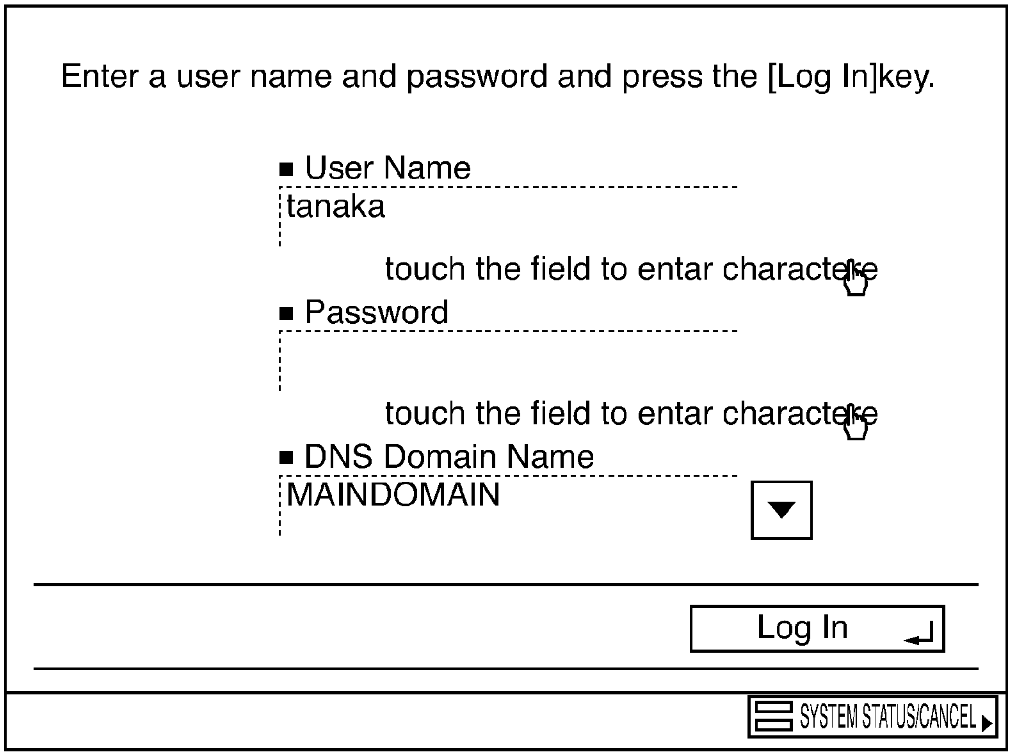
FIG. 12 is a view illustrating an example of a login screen displayed on the operating unit appearing in FIG. 2.

Thus, it is possible to prevent occurrence of a phenomenon that even after logout of a preceding user, a job started by the preceding user is left suspended in the interaction mode, in a state where a login screen shown in FIG. 12 is displayed for a new user. Further, a job which cannot be shifted to the interaction mode can be continuously executed even after logout, which makes it possible to reduce the downtime of the MFP to thereby improve productivity of the same.

Figure 8:
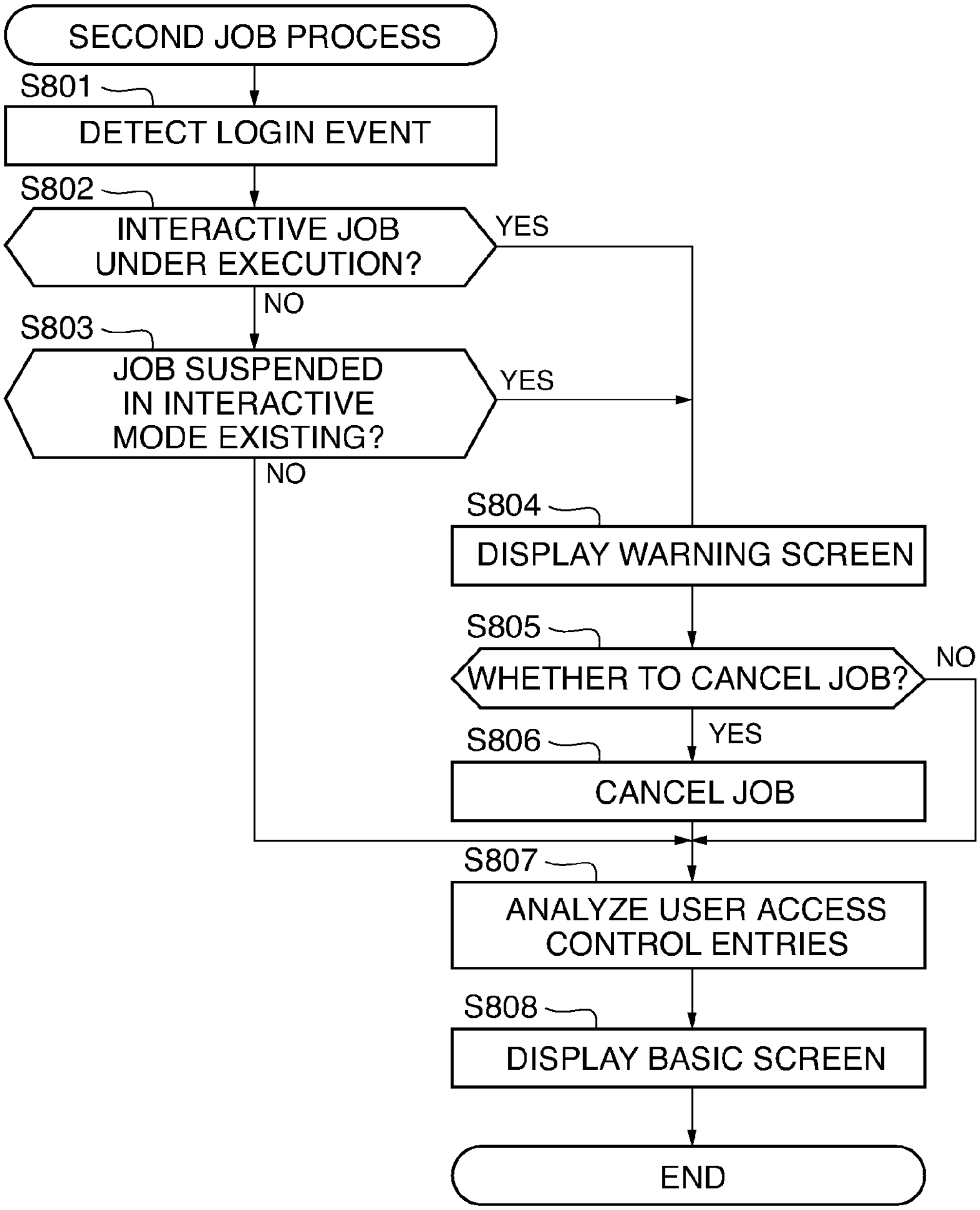
FIG. 8 is a flowchart of a second job process which is executed by the MFP in FIG. 2.

FIG. 8 is a flowchart of a second job process which is executed by the MFP in FIG. 2.

The present process is executed by the CPU 201 of the MFP 104.

The process of the present flowchart may be either provided independently of the process shown in FIG. 7 which is executed for logout, or may be provided in combination therewith.

Referring to FIG. 8, first, a login event is detected (step S801), and it is determined whether or not an interactive job which can be shifted to the interaction mode is under execution (step S802). The step S802 is executed in the same manner as the step S702 in FIG. 7. If such an interactive job is not under execution, the process proceeds to a step S803, wherein it is determined whether or not there is a job suspended in the interaction mode.

If there is no job suspended in the interaction mode, the process proceeds to a step S807. In the step S807, access control entries associated with the user are analyzed based on the ACT 105, and then a basic screen enabled for the user, shown in FIG. 13 by way of example, is displayed (step S808), followed by terminating the present process.

In the present embodiment, a case is described by way of example in which the ACT shown in FIG. 6 is issued from the SA 102 as access control entries associated with the logged-in user, and the user is unauthorized to gain access to the send function as described in the access control entries 602. For this reason, a copy (simple) tab 1301, a copy (quick) tab 1302, and a box tab 1303 are displayed on the screen in FIG. 13, but a send tab is not.

Figure 14:
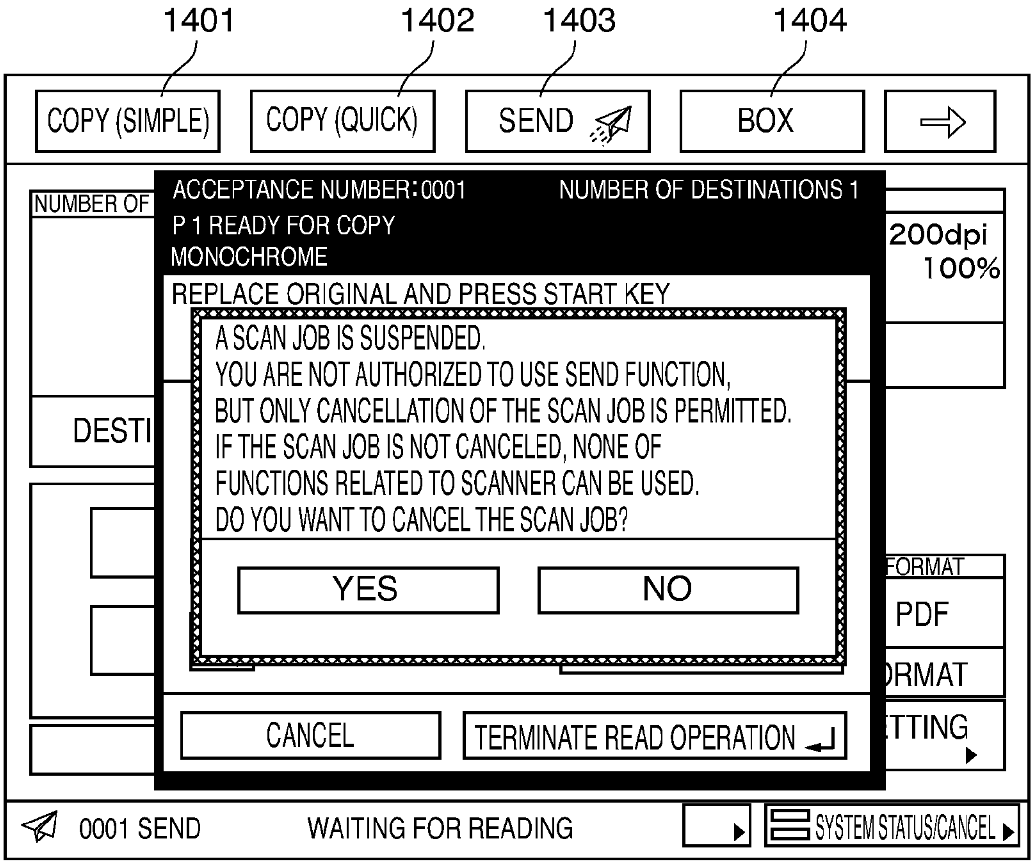
FIG. 14 is a view illustrating an example of a confirmation screen displayed on the operating unit appearing in FIG. 2, when there is an interactive job under execution at login time, or when there is a job suspended in an interaction mode at login time.

On the other hand, if it is determined in the step S802 that an interactive job is under execution, or if it is determined in the step S803 that there is a job suspended in the interaction mode, the process proceeds to a step S804, wherein a warning screen shown in FIG. 14 by way of example is displayed so as to enable access to the send function only for instructing whether or not to cancel the job under execution or the job suspended in the interaction mode.

In this case, as shown in FIG. 14, although access to the send function is restricted by the access control entries 602, a copy (simple) tab 1401, a copy (quick) tab 1402, and a box tab 1403 are displayed. The job suspended in the interaction mode may be a scan job in which an original jam has occurred, for example.

Then, if it is determined in a step S805 that the user has designated cancellation of the job, the job is canceled in a step S806, and then the process proceeds to the step S807. With this configuration, even when an original jam occurs in a state where a non-interactive scan job continues to be under execution after logout and then a user unauthorized to gain access to the scan function logs in, it is possible to terminate the scan job and carry out a copy operation.

Figure 13:
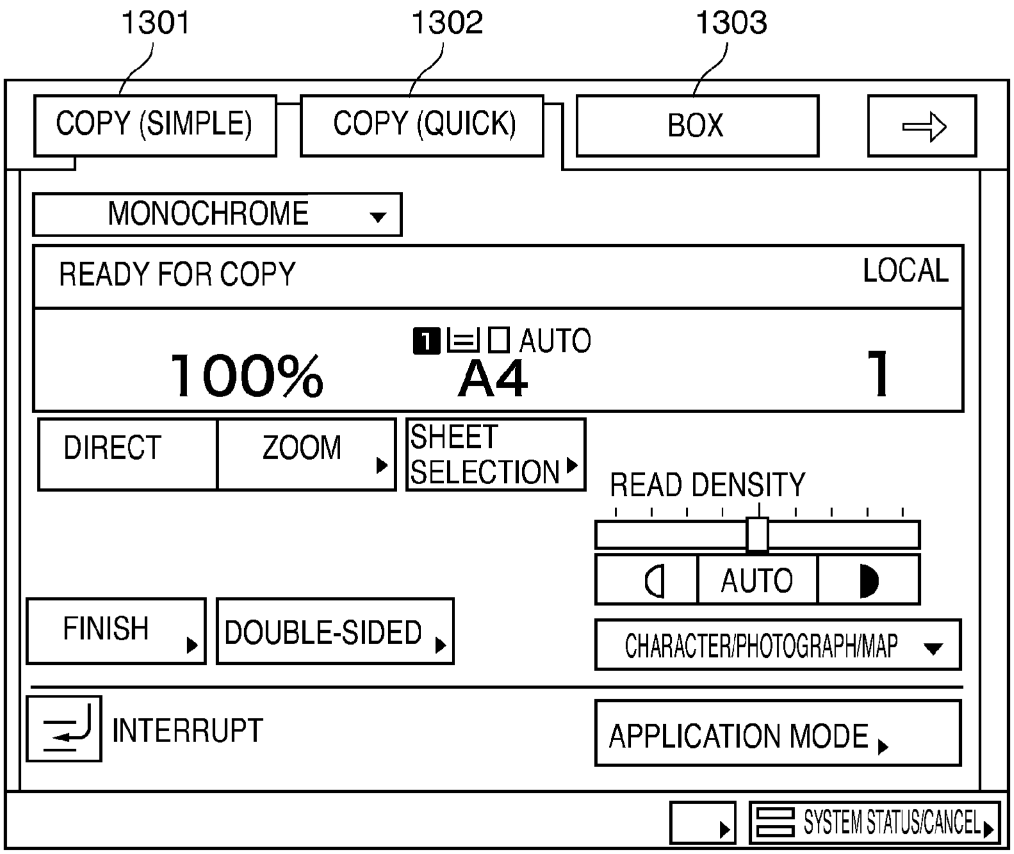
FIG. 13 is a view illustrating an example of a screen displayed on the operating unit appearing in FIG. 2, in which a send function to be displayed after login is disabled.

Further, after termination of the scan job, in the step S807, the send tab is not displayed as shown in FIG. 13, so that it is possible to control i.e. restrict input of a new job using the originally disabled send function. On the other hand, if it is determined in the step S805 that the user has designated non-cancellation of the job, the process immediately proceeds to the step S807, and the steps S807 et seq. are executed following the above-described procedure. In this case, the user is not authorized to use functions associated with the scanner.

It is to be understood that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2006-339067 filed Dec. 15, 2006, which is hereby incorporated by reference herein in its entirety.

What is claimed is:

1. An image processing apparatus comprising:

an operating unit comprising a user interface configured to receive an operation from a user who has logged-in to the image processing apparatus;

a job execution unit configured to execute a job based on the operation received by said operating unit;

a determination unit configured to determine whether or not the job requires an instruction via the operating unit after a logout event has been detected; and a control unit configured to:

in a case where the determination unit determines that the job requires the instruction via the operating unit after the logout event has been detected, prevent a user's instruction-waiting state from occurring after the user has logged-out from the image processing apparatus; and in a case where the determination unit determines that the job does not require the instruction via the operating unit after the logout event has been detected, allow the job to continue under execution after the user has logged-out from the image processing apparatus, wherein at least part of the control unit is implemented by a processor and a memory.

2. An image processing apparatus as claimed in claim 1, wherein the control unit, in a case where the determination unit determines that the job requires the instruction via the operating unit after the logout event has been detected, cancels the job in accordance with detection of the logout event.

3. An image processing apparatus as claimed in claim 1, wherein the control unit, in a case where the determination unit determines that the job requires the instruction via the operating unit after the logout event has been detected, changes the job to a job not requiring an instruction via the operating unit in accordance with detection of the logout event.

4. An image processing apparatus as claimed in claim 1, wherein the logout event is due to no operation from a user over a predetermined time period.

5. An image processing apparatus as claimed in claim 1, wherein the job requiring the instruction via the operating unit is a test copy job for checking a first one of a plurality of copies of printout and then outputting the remaining copies in accordance with reception of the instruction via the operating unit.

6. An image processing apparatus as claimed in claim 1, wherein:

the job requiring the instruction via the operating unit is a job in which a preview function is set, and in a case where the preview function is set, a scanned original image is displayed and the scanned original image is transmitted in accordance with reception of the instruction via the operating unit.

7. An image processing apparatus as claimed in claim 1, wherein the job requiring the instruction via the operating unit is a continuous scan job in which each original image is scanned in accordance with reception of the instruction via the operating unit.

8. A method of controlling an image processing apparatus, the method comprising:

a reception step of receiving an operation from a user who has logged-in to the image processing apparatus;

a job execution step of executing a job based on the operation received at said reception step;

a determination step of determining whether or not the job requires an instruction via the reception step after a logout event has been detected; and control steps of:

in a case where the determination step determines that the job requires the instruction via the reception step after the logout event has been detected, preventing a user's instruction-waiting state from occurring after the user has logged-out from the image processing apparatus; and in a case where the determination step determines that the job does not require the instruction via the reception step after the logout event has been detected, allowing the job to continue under execution after the user has logged-out from the image processing apparatus.

9. A non-transitory computer-readable storage medium storing a computer-readable program executable by a computer to execute a method of controlling an image processing apparatus, wherein the program comprises:

a reception module that receives an operation from a user who has logged-in to the image processing apparatus;

a job execution module that executes a job based on the operation received by said reception module;

a determination module that determines whether or not the job requires an instruction via the reception module after a logout event has been detected; and a control module that:

in a case where the determination module determines that the job requires the instruction via the reception module after the logout event has been detected, prevents a user's instruction-waiting state from occurring after the user has logged-out from the image processing apparatus; and in a case where the determination module determines that the job does not require the instruction via the reception module after the logout event has been detected, allows the job to continue under execution after the user has logged-out from the image processing apparatus.

10. An image processing apparatus comprising:

an operating unit comprising a user interface configured to receive an operation from a user who has logged-in to the image processing apparatus;

a job execution unit configured to execute a job based on the operation received by said operating unit;

a determination unit configured to determine whether or not the job requires an instruction via the operating unit after a logout event has been detected; and a control unit configured to:

in a case where the determination unit determines that the job requires the instruction via the operating unit after the logout event has been detected, cancels the job in accordance with detection of the logout event; and in a case where the determination unit determines that the job does not require the instruction via the operating unit after the logout event has been detected, allow the job to continue under execution after the user has logged-out from the image processing apparatus, wherein at least part of the control unit is implemented by a processor and a memory.

11. An image processing apparatus comprising:

an operating unit comprising a user interface configured to receive an operation from a user who has logged-in to the image processing apparatus;

a job execution unit configured to execute a job based on the operation received by said operating unit;

a detector unit configured to detect a logout event notified from a logged-in user; and a control unit configured to:

in a case where the logout event is detected by the detector unit while a job not requiring an instruction via the operation unit after the logout event has been detected is being executed, allow the logged-in user to log out of the image processing apparatus while the job continues to be under execution; and in a case where the logout event is detected by the detector unit while a job requiring an instruction via the operation unit after the logout event has been detected is being executed, restrict the logged-in user from logging out of the image processing apparatus while the job continues to be under execution, wherein at least part of the control unit is implemented by a processor and a memory.

12. An image processing apparatus as claimed in claim 11, wherein the job requiring the instruction via the operating unit is a test copy job for checking a first one of a plurality of copies of printout and then outputting the remaining copies in accordance with reception of the instruction via the operating unit.

13. An image processing apparatus as claimed in claim 11, wherein:

the job requiring the instruction via the operating unit is a job in which a preview function is set, and in a case where the preview function is set, a scanned original image is displayed and the scanned original image is transmitted in accordance with reception of the instruction via the operating unit.

14. An image processing apparatus as claimed in claim 11, wherein the job requiring the instruction via the operating unit is a continuous scan job in which each original image is scanned in accordance with reception of the instruction via the operating unit.

15. An image processing apparatus as claimed in claim 11, further comprising a display unit configured to display a warning screen in a case where the control unit restricts the logged-in user from logging out of the image processing apparatus while the job continues to be under execution.

16. A method of controlling an image processing apparatus, the method comprising:

a reception step of receiving an operation from a user who has logged-in to the image processing apparatus;

a job execution step of executing a job based on the operation received at said reception step;

a detection step of detecting a logout event notified from a logged-in user; and control steps of:

in a case where the logout event is detected in the detection step while a job not requiring an instruction via the reception step after the logout event has been detected is being executed, allowing the logged-in user to log out of the image processing apparatus while the job continues to be under execution; and in a case where the logout event is detected in the detection step while a job requiring an instruction via the reception step after the logout event has been detected is being executed, restricting the logged-in user from logging out of the image processing apparatus while the job continues to be under execution.

17. A non-transitory computer-readable storage medium storing a computer-readable program executable by a computer to execute a method of controlling an image processing apparatus, wherein the program comprises:

a reception module that receives an operation from a user who has logged-in to the image processing apparatus;

a job execution module that executes a job based on the operation received by said reception module;

a detection module that detects a logout event notified from a logged-in user; and a control module that:

in a case where the logout event is detected by the detection module while a job not requiring an instruction via the reception module after the logout event has been detected is being executed, allowing the logged-in user to log out of the image processing apparatus while the job continues to be under execution; and in a case where the logout event is detected by the detection module while a job requiring an instruction via the reception module after the logout event has been detected is being executed, restricting the logged-in user from logging out of the image processing apparatus while the job continues to be under execution.

* * * * *